United States Patent
Rus et al.

(10) Patent No.: US 10,007,461 B1
(45) Date of Patent: *Jun. 26, 2018

(54) REDISTRIBUTING DATA IN A DISTRIBUTED STORAGE SYSTEM BASED ON ATTRIBUTES OF THE DATA

(71) Applicant: Quantcast Corporation, San Francisco, CA (US)

(72) Inventors: Silvius V. Rus, Orinda, CA (US); Michael Ovsiannikov, Saratoga, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/636,329

(22) Filed: Jun. 28, 2017

Related U.S. Application Data

(63) Continuation of application No. 15/357,632, filed on Nov. 21, 2016, which is a continuation of application No. 14/950,461, filed on Nov. 24, 2015, now Pat. No. 9,529,540, which is a continuation of application No. 13/666,709, filed on Nov. 1, 2012, now Pat. No. 9,229,657.

(51) Int. Cl.
  *G06F 12/02* (2006.01)
  *G06F 3/06* (2006.01)

(52) U.S. Cl.
  CPC .............. *G06F 3/064* (2013.01); *G06F 3/067* (2013.01); *G06F 3/0613* (2013.01); *G06F 3/0631* (2013.01)

(58) Field of Classification Search
  CPC ...... G06F 3/064; G06F 3/0613; G06F 3/0631; G06F 3/067
  See application file for complete search history.

(56) References Cited

U.S. PATENT DOCUMENTS

| 5,317,728 A | 5/1994 | Tevis et al. |
| 5,970,495 A | 10/1999 | Baru et al. |

(Continued)

OTHER PUBLICATIONS

Glagoleva, A. et al., "A Load Balancing Tool Based on Mining Access Patterns for Distributed File System Severs," 35.sup.th Hawaii International Conference on System Sciences, IEEE, 2002, 8 pages.

(Continued)

*Primary Examiner* — Reginald Bragdon
*Assistant Examiner* — Mehdi Namazi
(74) *Attorney, Agent, or Firm* — Robin W. Reasoner; Renee D. Jacowitz

(57) ABSTRACT

Accesses to a number of data blocks stored in a distributed storage are observed. Following observation of the accesses, the stored data blocks are redistributed. In one aspect, redistribution of the data blocks includes determining the access patterns for one or more of the data blocks based on the observed accesses, and determining the storage sizes for the one or more data blocks. Thereafter, based on the determined access patterns and determined storage sizes, the one or more data blocks are sorted. Subsequently, the one or more data blocks are redistributed or rebalanced across a number of storage devices of the distributed storage based on the sorting. In one aspect, the one or more data blocks are redistributed according to either a uniform distribution scheme or a proportional distribution scheme.

18 Claims, 9 Drawing Sheets

(56) References Cited

U.S. PATENT DOCUMENTS

| | | |
|---|---|---|
| 6,301,605 B1 | 10/2001 | Napolitano et al. |
| 8,112,395 B2 | 2/2012 | Patel et al. |
| 2002/0120763 A1 | 8/2002 | Miloushev et al. |
| 2002/0124137 A1 | 9/2002 | Ulrich et al. |
| 2002/0136406 A1 | 9/2002 | Fitzhardinge et al. |
| 2003/0115218 A1 | 6/2003 | Bobbitt et al. |
| 2003/0115434 A1 | 6/2003 | Mahalingam et al. |
| 2004/0078466 A1 | 4/2004 | Coates et al. |
| 2005/0102484 A1 | 5/2005 | Liu et al. |
| 2005/0144514 A1 | 6/2005 | Ulrich et al. |
| 2006/0101025 A1 | 5/2006 | Tichy et al. |
| 2007/0088703 A1 | 4/2007 | Kasiolas et al. |
| 2008/0005475 A1 | 1/2008 | Lubbers et al. |
| 2008/0263103 A1 | 10/2008 | McGregor et al. |
| 2010/0274982 A1 | 10/2010 | Mehr et al. |
| 2011/0107053 A1 | 5/2011 | Beckmann et al. |
| 2011/0138148 A1 | 6/2011 | Friedman et al. |
| 2012/0059978 A1 | 3/2012 | Rosenband et al. |
| 2012/0117297 A1 | 5/2012 | Ish |
| 2014/0006354 A1 | 1/2014 | Parkison et al. |
| 2014/0032595 A1 | 1/2014 | Makkar et al. |

OTHER PUBLICATIONS

U.S. Office Action, U.S. Appl. No. 13/666,709, dated May 5, 2015, 9 pages.

U.S. Office Action, U.S. Appl. No. 14/950,461, dated May 10, 2016, 8 pages.

U.S. Office Action, U.S. Appl. No. 15/357,632, dated May 3, 2017, 8 pages.

Prior to Redistribution

Following Redistribution

Prior to Redistribution

Following Redistribution

REDISTRIBUTING DATA IN A DISTRIBUTED STORAGE SYSTEM BASED ON ATTRIBUTES OF THE DATA

CROSS-REFERENCE TO RELATED APPLICATIONS

This application is a continuation of U.S. Non-Provisional application Ser. No. 15/357,632 entitled "Redistributing Data in a Distributed Storage System Based on Attributes of the Data" by Silvius V. Rus and Michael Ovsiannikov, filed on Nov. 21, 2016, which is a continuation of U.S. Non-Provisional application Ser. No. 14/950,461 entitled "Redistributing Data in a Distributed Storage System Based on Attributes of the Data" by Silvius V. Rus and Michael Ovsiannikov, filed on Nov. 24, 2015, now U.S. Pat. No. 9,529,540 issued on Dec. 27, 2016, which is a continuation of U.S. Non-Provisional application Ser. No. 13/666,709 entitled "Redistributing Data in a Distributed Storage System Based on Attributes of the Data" by Silvius V. Rus and Michael Ovsiannikov, filed on Nov. 1, 2012, now U.S. Pat. No. 9,229,657 issued on Jan. 5, 2016, all of which are hereby incorporated by reference in their entirety.

BACKGROUND

1. Technical Field

This invention pertains in general to distributed storage systems, and in particular to methods of redistributing data in a distributed storage system based on attributes of the data.

2. Description of Related Art

Distributed storage systems often store and manage data files across hundreds or thousands of interconnected storage devices (e.g., magnetic-based hard drives). In order to store a new data file, a distributed storage system typically identifies a storage device that has available free space. Following identification of the storage device, the distributed storage system allocates the new data file to the identified storage device accordingly.

One problem with such a storage technique is that data hot spots are frequently created within current distributed storage systems. More specifically, in storing data files based on available storage, a disproportionate amount of newer data files may be allocated to a small number of a distributed storage system's storage devices. Because newer data files are more likely to be frequently accessed relative to older data files, the bulk of data operations (e.g., read and/or write operations) performed by the distributed storage system are likely to be concentrated on the small number of storage devices. When data is concentrated in this way, however, the retrieval of the newer data at a large scale can be bottlenecked by the performance limitations of the small number of storage devices.

Another problem with current distributed storage systems involves differences in the sizes of data blocks stored by the distributed storage systems. As used herein, a data block refers to a basic unit of storage for a distributed storage system. In storing a data file, a distributed storage system typically breaks up or divides the data file into one or more data blocks. In some instances, the data blocks stored by a distributed storage system can vary in storage size. For example, a data block stored in a particular storage device may be 64 MB in size while another data block stored in the same storage device may be 256 MB in size. Over time, certain storage devices of a distributed storage system may accumulate a large number of small data blocks while other storage devices may accumulate a small number of large data blocks. Because storage device performance is often gated by a limited number of I/O operations per second, the retrieval of data files from storage devices containing many small data blocks can be relatively poor due to seek operation-related overhead or lag.

Due to the aforementioned problems, the performance levels (e.g., overall data throughputs) of current distributed storage systems frequently become poor over time. As a consequence, the time needed to retrieve data files from the distributed storage systems often rises to unacceptable levels.

SUMMARY

Embodiments of the invention include a method, a non-transitory computer readable storage medium and a system for redistributing or rebalancing data in a distributed storage system based on attributes of the data.

Embodiments of the method include observing accesses to a number of data blocks stored in a distributed storage. Following observation of the accesses, the stored data blocks are redistributed or rebalanced across the distributed storage. In one aspect, redistribution of the data blocks includes determining access patterns for one or more of the data blocks based on the observed accesses, and determining the storage sizes for the one or more data blocks. Thereafter, the one or more data blocks are sorted or categorized based on the determined access patterns and storage sizes. Subsequently, the one or more data blocks are redistributed across a number of storage devices of the distributed storage based on the sorting. In one aspect, the one or more data blocks are redistributed according to one of a uniform distribution scheme or a proportional distribution scheme.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
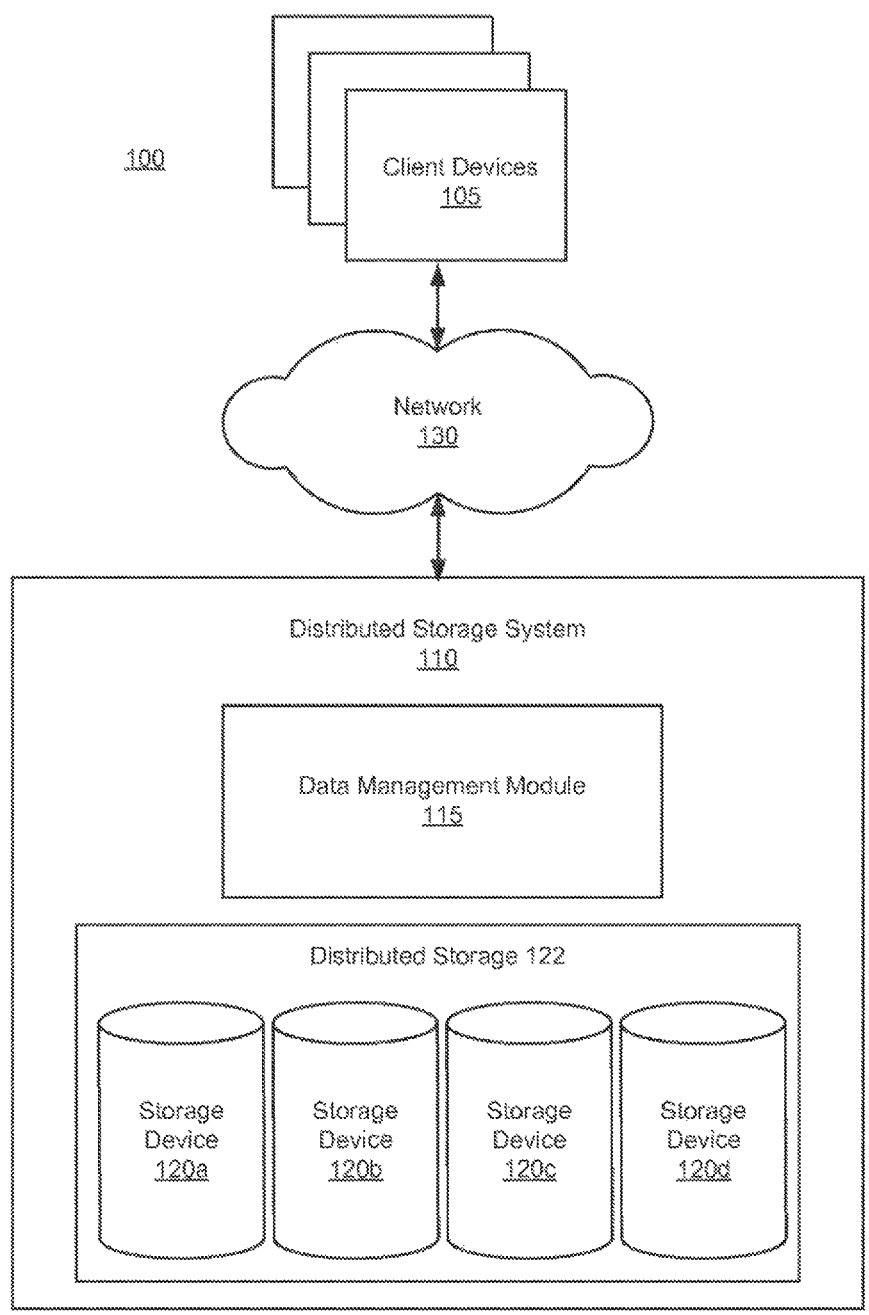
FIG. 1 is a high-level block diagram of a computing environment for redistributing data in a distributed storage system based on attributes of the data according to one embodiment.

FIG. 1 is a high-level block diagram of a computing environment for redistributing data in a distributed storage system based on attributes of the data in accordance with an embodiment of the invention. In particular, the environment 100 can be used to periodically redistribute data blocks having similar access patterns and/or storage sizes uniformly or proportionally across the storage devices of the distributed storage system. As a result, heavy concentrations of frequently accessed and/or small sized data blocks stored within a small number of storage devices can be avoided. Consequently, the overall data throughput of the distributed storage system can be improved.

As shown in FIG. 1, the computing environment includes client devices 105 and a distributed storage system 110 communicating with one another via the network 130. Only three client devices 105 are shown in FIG. 1 for purposes of clarity, but those of skill in the art will recognize that typical environments can have hundreds, thousands, millions, or even billions of client devices 105.

The network 130 enables communications between the client devices 105 and the distributed storage system 110. In one embodiment, the network 130 uses standard communications technologies and/or protocols, and may comprise the Internet. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The client devices 105 are electronic devices used by users to provide data for storage by and to retrieve data from the distributed storage system 110 via the network 130. The data provided by the client devices 105 can include one or more data files (e.g., word processing files, spreadsheet files, audio files, images files, and/or any other suitable types of files). Each of the client devices 105 may be a suitable computing device. For example, an individual client device 105 may be a mobile computing device, such as a smartphone, tablet device, portable gaming device, e-reading device, personal digital assistant (PDA), etc. An individual client device 105 may also be another device, such as a desktop computer system, laptop, workstation, or server. In one aspect, the client devices 105 each executes a suitable operating system, such as Android, Apple iOS, a Microsoft Windows-compatible operating system, Apple OS X, UNIX, and/or a Linux distribution. The client device 105 may further execute suitable software applications, such as a web browser (e.g., Google Chrome, Microsoft Internet Explorer, Apple Safari, Mozilla Firefox, etc.), a native application (e.g., Microsoft Word for the Windows Operating System), etc.

The distributed storage system 110 stores data files received from the client devices 105 and retrieves data requested by the client devices 105 via the network 130. As shown in FIG. 1, the distributed storage system includes a distributed storage 122 and a data management module 115.

The distributed storage 122 stores data files received from the client devices 105. In one aspect, the data files stored by the distributed storage 122 are segmented or divided into one or more data blocks. As discussed, a data block can refer to a basic storage unit of the distributed storage system 110. As shown in FIG. 1, the distributed storage 122 includes one or more interconnected storage devices 120. In one aspect, the storage devices 120 are operated as a single logical entity despite being separate physical devices. Only four storage devices 120 are shown in FIG. 1 for purposes of clarity, but those of skill in the art will recognize that typical environments can have hundreds, thousands, or millions of interconnected storage devices 120 located in one or more geographical locations.

In one aspect, each of the storage devices 120 is a suitable storage device, such as a magnetic-based hard drive, a flash-based storage device (e.g., a NAND based solid state hard drive), an optical storage device, a storage device based on random access memory, and/or the like. In one embodiment, the storage devices 120 are each the same type of storage device and have similar device characteristics. For example, each of the storage devices 120 may be a magnetic-based hard drive having 1 TB of storage space and operating at 7200 revolutions per minute (RPM). In another embodiment, the storage devices 120 are diverse storage devices having varying device characteristics. For example, referring to FIG. 1, the storage devices 120a and 120b may be magnetic-based hard drives having 1 TB of storage space and operating at 10,000 RPM. The storage device 120c may be a magnetic-based hard drive having 2 TB of storage space and operating at 7200 RPM. Lastly, the storage device 120d may be a flash-based storage device having 480 GB of storage space.

The data management module 115 manages the storage and retrieval of data files stored in the distributed storage 122. In one aspect, the data files stored in the distributed storage 122 by the data management module 115 are structured and managed according to one or more suitable file systems. For example, the data management module 115 may utilize the Hadoop Distributed File System (HDFS) to structure and manage the data stored in the distributed storage 122.

In one aspect, the data management module 115 periodically redistributes or rebalances the data blocks of the data files stored in the distributed storage 122 based on one or more attributes of the data blocks. More specifically, the data management module 115 shifts or moves the data blocks such that those data blocks having similar attributes, such as similar access patterns and/or storage sizes, are spread out across the storage devices 120 of the distributed storage 122. For example, the data management module 115 may shift data blocks that have been accessed relatively recently and/or frequently (i.e., "hot" data blocks) such that the data blocks are suitably spread out across the storage devices 120. In one embodiment, the data management module 115 redistributes data blocks having similar attributes uniformly across the storage devices 120 of the distributed storage 122. In another embodiment, the data management module 115 redistributes data blocks having similar attributes proportionally across the storage devices 120 according to the bandwidths (speeds) or some other performance measures of the storage devices 120.

By redistributing data blocks in the manner described, the data management module 115 enables the overall data throughput (e.g., overall read throughput) of the distributed storage 122 to be improved. More specifically, by redistributing data blocks having similar access patterns uniformly or proportionally across the storage devices 120, the data management module 115 prevents frequently accessed data blocks from being concentrated on a small number of storage devices 120. In doing so, performance bottlenecks associated with retrieving large amounts of frequently accessed data blocks from a small number of storage devices 120 can be avoided. Put another way, by spreading frequently accessed data blocks across a large number of storage devices 120 rather than concentrating the data blocks in a small number of storage devices 120, each storage device 120 is required to handle fewer data operations. As a result, the impact of limitations with respect to the number of data operations a storage device 120 is able to perform within a given timeframe is minimized.

Furthermore, by redistributing data blocks having similar storage sizes uniformly or proportionally across the storage devices 120, the data management module 115 prevents small data blocks from accumulating on a small number of storage devices 120. As a result, seek operation-related overhead can be reduced for each of the storage devices 120. As an illustrative example highlighting the problem, 50 MB may need to be read from a particular storage device 120. Each data block in the storage device 120 may be 1 MB in size. Furthermore, reading 50 data blocks may require 1 second. Thus, retrieving the 50 MB would require 1 second of time. Now consider a situation where the storage device 120 includes, instead, a concentration of data blocks each having a size of 10 KB. In such a situation, retrieving the 50 MB would require 100 seconds, which may be an unacceptable performance level for the distributed storage system. Redistributing data blocks in the manner described herein enables such a situation to be avoided.

Hence, through minimizing the effects of performance bottlenecks and seek operation-related overhead, the data management module 115 enables the overall data throughput of the distributed storage system 110 to be improved. As a result, retrieval of data from the distributed storage 122 can be performed in a timely manner. In doing so, among other benefits, streams of data retrieved from the data storage system and provided to various processors (e.g., CPUs of client devices, etc.) for processing can be suitably maintained such that the processors can be efficiently utilized (e.g., operated at full or near full utilization).

System Architecture

Figure 2:
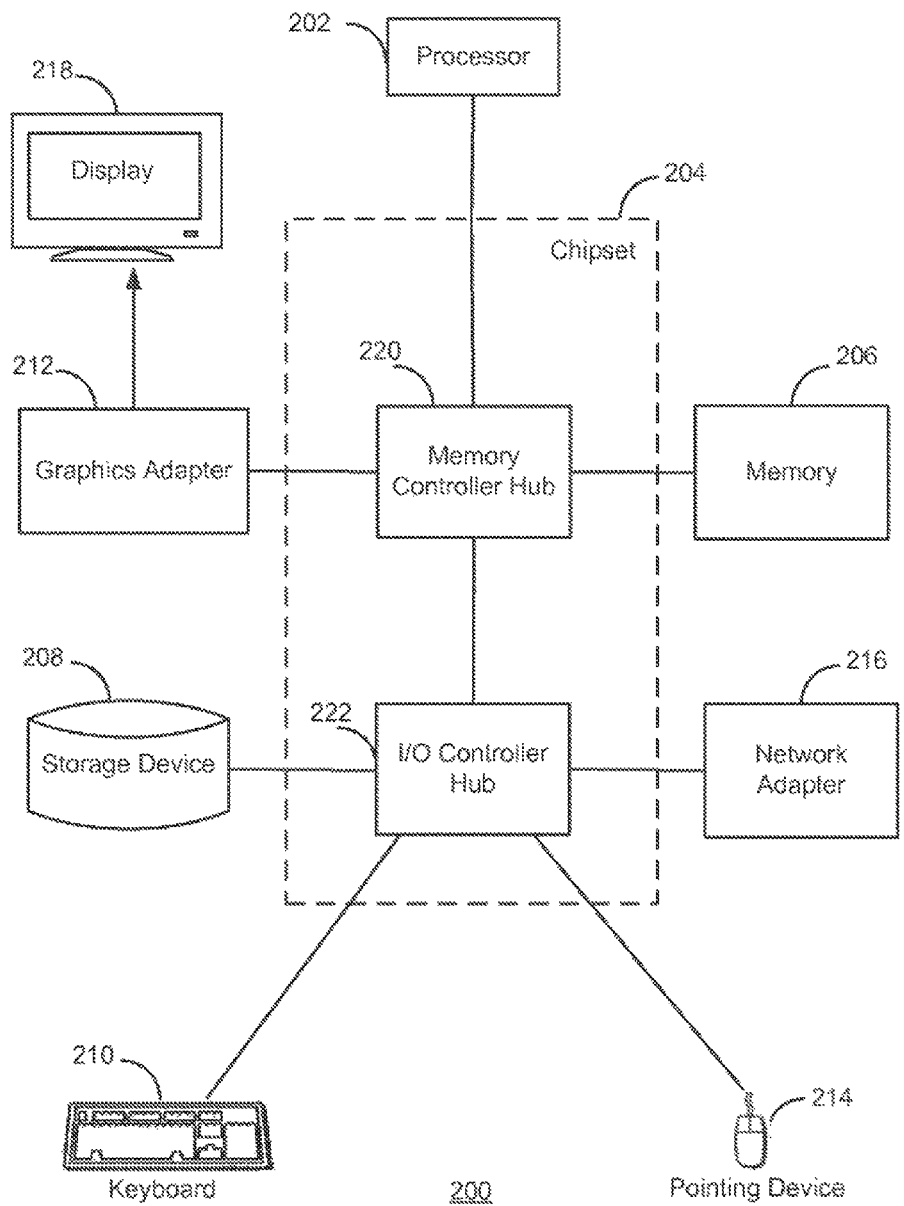
FIG. 2 is a high-level block diagram of a computer system for redistributing data in a distributed storage system based on attributes of the data according to one embodiment.

FIG. 2 is a high-level block diagram of a computer 200 for use as the client devices 105 or the distributed storage system 110 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 130.

As is known in the art, a computer 200 can have different and/or other components than those shown in FIG. 2. In addition, the computer 200 can lack certain illustrated components. In one embodiment, a computer 200 acting as the distributed storage system 110 is formed of multiple spatially and/or time distributed blade computers and lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Data Management Module

Figure 3A:
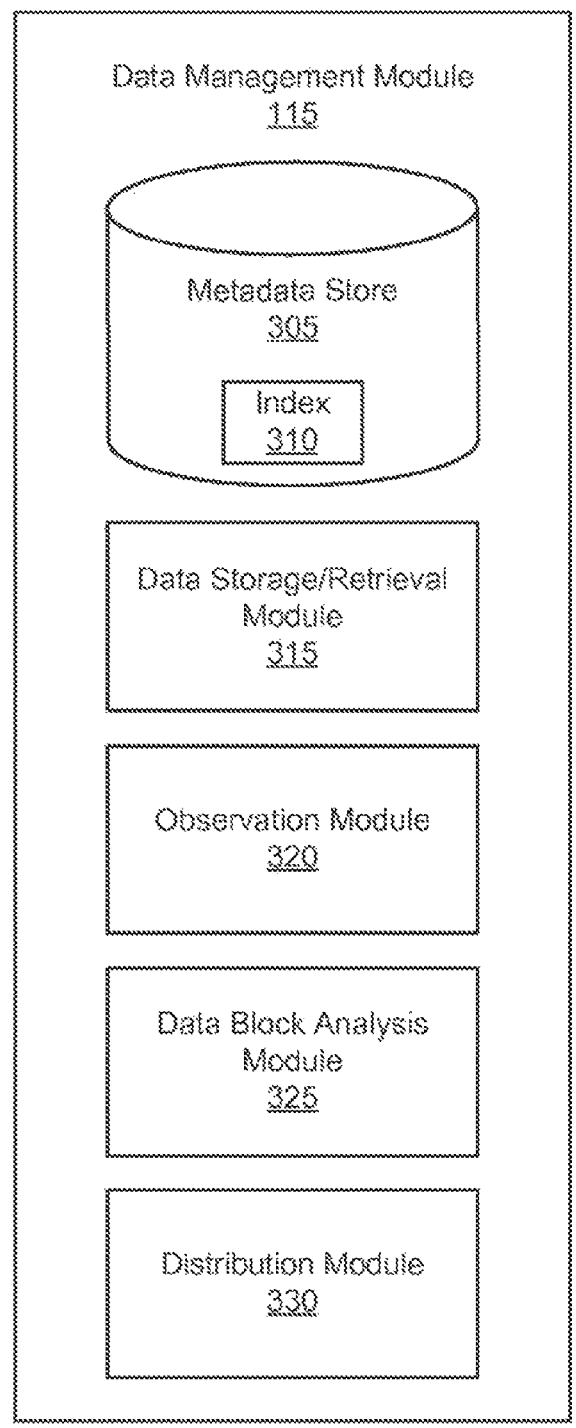
FIG. 3A is a high-level block diagram illustrating a detailed view of modules within a data management module according to one embodiment.

FIG. 3A is a high-level block diagram illustrating a detailed view of modules within the data management module 115 according to one embodiment. Some embodiments of the data management module 115 have different and/or other modules than the ones described herein. Similarly, the functions can be distributed among the modules in accordance with other embodiments in a different manner than is described here. Likewise, the functions can be performed by other entities.

The metadata store 305 stores information usable for facilitating the storage and redistribution of data in the distributed storage 122. In one aspect, the metadata store 305 stores device characteristic information for the storage devices 120 of the distributed storage 122. In one aspect, the device characteristic information specifies the bandwidth or some other performance measure for each of the storage devices 120. Illustratively, the device characteristic information may indicate that a particular storage device 120 has a bandwidth of 50 MB/s. The device characteristic information further specifies the total capacity of each storage device 120. Illustratively, the device characteristic information may indicate that a particular storage device 120 has a storage capacity of 2 TB.

The metadata store 305 additionally stores attribute information for the data blocks stored in the distributed storage 122. In one aspect, the attribute information specifies the storage size of each data block. For example, the attribute information may indicate that a particular data block is 10 KB, 100 KB, 1 MB, 10 MB, 64 MB, 100 MB, 128 MB, 256 MB, 512 MB, 1 GB, or larger in size. The attribute information further includes data regarding the access patterns of the various data blocks. In one aspect, the access pattern data for a particular data block includes a timestamp indicating when the data block was most recently accessed. The access pattern data for the data block may further include additional data such as the number of times the data block has been accessed over a predefined time period (e.g., in the last 24 hours, week, etc.) and/or the number of times the data block has been accessed since being stored in the distributed storage 122.

In one aspect, the metadata store 305 additionally stores a data index 310. The data index 310 maps each data block to the particular storage device 120 where the data block is currently stored. For example, the data index 310 can include an entry associating an identifier for a data block and an identifier for the storage device 120 currently storing the data block. The data index 310 further maps stored data blocks to one or more data files. The mapping indicates, for each data file, those data blocks in which at least a portion of the data file is stored. For example, the data index 306 can include an entry associating a unique identifier of a data file with a unique identifier for a data block storing a portion of the data file.

The metadata store 305 moreover stores other suitable types of information for facilitating the storage and redistribution of the data blocks. For example, the metadata store 305 can store redundancy information. Such redundancy information can indicate which data blocks store the same portion of a data file for purposes of fault tolerance. The redundancy information can be leveraged to ensure that such data blocks are not redistributed to the same storage devices 120.

The data storage/retrieval module 315 stores data files received from the client devices 105 and/or generated by the distributed storage system 110 in the distributed storage 122. In storing a data file, the data storage/retrieval module 315 segments and stores the data file in one or more data blocks. The data storage/retrieval module 315 additionally updates the data index 310 such that the data file can be later retrieved. More specifically, the data storage/retrieval module 315 may update the data index 310 to indicate the data blocks storing the data file. The data storage/retrieval module 315 may additionally update the data index 310 to indicate the storage devices 120 containing the data blocks storing the data file.

In addition to storing data files, the data storage/retrieval module 315 retrieves data files requested by the client devices 105. In order to retrieve a data file, the data storage/retrieval module 315 references the data index 310 to determine the data blocks storing the data file. The data storage/retrieval module 315 additionally references the data index store 305 to determine the storage devices 120 containing the determined data blocks storing the data file. Based on the determined information, the data storage/retrieval module 315 retrieves the data blocks for the data file from the storage devices 120, and assembles the data file using the retrieved data blocks. Thereafter, the assembled data file is sent to the requesting client device 105.

The observation module 320 monitors accesses to the data blocks of the distributed storage 122 and stores access pattern data for the data blocks in the metadata store 305. More specifically, during operation, the observation module 320 identifies data operations (e.g., read or write operations) to the data blocks of the distributed storage 122. Each time a data operation to a data block is identified, the observation module 320 updates access pattern data for the data block in the metadata store 305. More specifically, after identifying a data operation to a data block, the observation module 320 updates a timestamp in the access pattern data for the data block to the current time. In doing so, it can be determined when the data block was last accessed. In one embodiment, the observation module 320 additionally increases a count indicating the number of times the data block has been accessed over a particular period of time. For example, the observation module 320 may update a count for the number of times the data block has been accessed in the last hour, 24 hours, week, month, or year. The observation module 320 can further increase a count indicating the total number of times the data block has been accessed since being stored in the distributed storage 122. As will be discussed, the access pattern data enables the data blocks of the distributed storage 122 to be redistributed.

The data block analysis module 325 analyzes the data blocks of the distributed storage 122 and sorts the data blocks according to the analysis based on a particular distribution scheme or policy. Examples of distribution schemes that may be employed by the data block analysis module 325 include a uniform distribution scheme and a proportional distribution scheme. Such schemes will be discussed in greater detail below.

In analyzing data blocks, the data block analysis module 325 is adapted to first periodically determine whether to redistribute the data blocks stored in the distributed storage 122. The data block analysis module 325 can initiate the performance of such a determination at any suitable predefined interval. For example, the data block analysis module 325 may perform such a determination on an hourly, weekly, monthly, or yearly basis.

In one embodiment, determination of whether to redistribute the data blocks of the distributed storage 122 can be performed by the data block analysis module 325 using any suitable criteria. In one implementation, the data block analysis module 325 determines whether to redistribute data blocks based on a measured performance level of the distributed storage 122. More specifically, the data block analysis module 325 may periodically measure the average data throughput of the distributed storage 122. If the measured average throughput of the distributed storage 122 is determined to be below a particular threshold throughput, the data block analysis module 325 initiates a redistribution of the data blocks. In another embodiment, the data block analysis module 325 initiates the redistribution of the data blocks without requiring any specific criteria to be met. Rather, redistribution of the data blocks may occur automatically based on the predefined interval. In yet other embodiments, the data block analysis module 325 initiates the redistribution of the data blocks automatically following addition or removal of a storage device 120 from the distributed storage 122, following failure of a storage device 120 of the distributed storage 122, following a Redundant Array of Independent Disks (RAID) rebuild, after a relatively large data archiving action, etc.

To redistribute the data blocks of the distributed storage 122, the data block analysis module 325 begins by sorting or assigning the data blocks to multiple predefined categories or "buckets." Each predefined bucket may be associated with a particular data block access pattern level (e.g., a particular access time range, an access count range, etc.) and a particular data block storage size requirement. Thus, the multiple data buckets can together represent varying degrees of access pattern levels and data block storage size requirements. Illustratively, a first bucket may be associated with an access pattern level specifying a most recent data block access time of 24 hours or less. The first bucket may additionally be associated with a storage size requirement of 64 MB. A second bucket may be associated with an access pattern level specifying a most recent data block access time between 24 and 72 hours. The second bucket may further be associated with a storage size requirement of 128 MB. A third bucket may be associated with an access pattern level specifying a most recent data block access time of 72 hours or longer. The third bucket may further be associated with a storage size requirement of 64 MB.

In sorting the data blocks, the data block analysis module 325 retrieves the access pattern data and storage size of each data block from the metadata store 305. Based on the retrieved access pattern data and storage size, the data block analysis module 325 assigns the data block to a particular bucket, where the access pattern data and storage size of the data block matches or meets the access pattern level and storage size requirement of the bucket. Illustratively, referring to the previous example, the data block analysis module 325 may assign a data block that was last accessed in the previous 20 minutes and has a size of 64 MB to the first bucket. The data block analysis module 325 may assign another data block that was last accessed 74 hours ago and has a size of 64 MB to the third bucket.

Following sorting of the data blocks, the data block analysis module 325 determines a target number of data blocks from each of the multiple buckets to be stored by each of the storage devices 120. Illustratively, the data block analysis module 325 may determine that a particular storage device 120 is to store a target of 300 data blocks from a first bucket, a target of 1,000 data blocks from a second bucket, and a target of 1,700 data blocks from a third bucket.

In one embodiment, the data block analysis module 325 determines the target number of data blocks for each storage device 120 for each predefined bucket according to a uniform distribution scheme. More specifically, for each bucket, each of the storage devices 120 may be adapted to store approximately the same number of data blocks from the bucket. In order to determine the target number of data blocks for each storage device 120 for each bucket, the data block analysis module 325 determines the total number of data blocks assigned to the bucket. Following determination of the total number of data blocks for the bucket, the data block analysis module 125 divides the total number of data blocks for the bucket by the total number of storage devices 120 in the distributed storage 122. The resulting value indicates the target number of data blocks to be stored in each storage device 120 for the bucket. As an illustrative example, a particular bucket may include 30 data blocks. The distributed storage 122 may include three storage devices 120. As such, the target number of data blocks for each storage device 120 for the particular bucket is ten.

In another embodiment, the data block analysis module 325 determines the target number of data blocks for each storage device 120 for each predefined bucket according to a proportional distribution scheme. More specifically, each of the storage devices 120 may be adapted to store a proportional number of data blocks from at least some of the buckets based on the bandwidth or some other performance measure of the storage device 120. In order to determine the target numbers of data blocks to be stored in the storage devices 120 for each bucket, the data block analysis module 325 determines the total number of data blocks in the bucket. The data block analysis module 325 further retrieves bandwidth information for each of the storage devices 120 by accessing the metadata store 305. For example, the data block analysis module 325 may access the metadata store 305 in order to determine that the bandwidth of a particular storage device 120 is 65 MB/s.

Following retrieval of the bandwidth of each of the storage device 120, the data block analysis module 325 sums the bandwidths of the storage devices 120 to determine a total bandwidth value. Thereafter, the data block analysis module 325 determines a proportional bandwidth value for each storage device 120 through dividing the individual bandwidth of the storage device 120 by the total bandwidth value. For example, the individual bandwidth of a particular storage device 120 may be 30 MB/s. The total bandwidth value of the storage devices 120 may be 100 MB/s. As such, the proportional bandwidth value for the storage device 120 is a value of 0.3.

Thereafter, the data block analysis module 325 determines, for each storage device 120, a target number of data blocks for the particular bucket, where the target number of data blocks is proportional to the bandwidth of the storage device 120. To determine the target number of data blocks for a particular storage device 120, the data block analysis module 325 multiplies the proportional bandwidth value of the particular storage device 120 by the total number of blocks in the particular bucket. For example, the total number of data blocks in the bucket may be 2,100 data blocks. Thus, with reference to the previous example, the target number of data blocks for the particular storage device 120 is the product of 2,100 and 0.3, or 630 data blocks.

After determining the target number for each data storage device 120 for each data bucket using either the uniform distribution scheme or the proportional distribution scheme, the data block analysis module 325 provides the bucket assignments for the data blocks, and the target number of data blocks for each storage device 120 for each bucket to the distribution module 330.

The distribution module 330 generates a redistribution plan for the data blocks of the distributed storage 122. The distribution module 330 additionally distributes the data blocks according to the generated redistribution plan. In one aspect, the distribution module 330 generates the redistribution plan by processing the data blocks by bucket. More specifically, the distribution module 330 processes the data blocks of a particular bucket before processing the data blocks of another bucket.

To process the data blocks of a particular bucket, the distribution module 330 identifies a storage device 120 based on an overflow policy, and selects a candidate data block from the storage device 120 for the bucket. In particular, the distribution module 330 selects the candidate data block from a storage device 120 containing a number of data blocks for the particular bucket that exceeds the target number of data blocks for the storage device 120 for the bucket by a threshold overflow number or a threshold overflow percentage. For example, a threshold overflow percentage may be 5%. A particular storage device 120 may store a number of data blocks for the bucket that is greater than 5% of the storage device 120's target number of data blocks for the bucket. Thus, the distribution module 330 selects a candidate data block from the particular storage device 120.

In one aspect, selection of the specific candidate data block from the identified storage device 120 is performed randomly or pseudo-randomly. For example, the identified storage device 120 may store 1,000 data blocks from the particular bucket. In processing data blocks, the distribution module 330 randomly or pseudo-randomly selects a candidate data block from the 1,000 data blocks stored on the identified storage device 120.

After selecting a candidate data block, the distribution module 330 determines a target storage device 120 to shift or move the selected candidate data block under the redistribution plan according to an underflow policy. In particular, the distribution module 330 selects a target storage device 120 that currently contains a number of data blocks for the bucket that is less than the target storage device 120's target number of data blocks for the bucket by a threshold underflow number or threshold underflow percentage. For example, a threshold underflow number may be 50 data blocks. A particular storage device 120 may store a number of data blocks that is 100 data blocks fewer than the storage device 120's target number of data blocks for the bucket. Thus, the distribution module 330 selects the storage device 120 as the target to which the candidate data block is to be moved under the redistribution plan.

In one aspect, the distribution module 330 additionally selects the target storage device 120 based on other policies. For example, the distribution module 330 may be constrained from selecting a storage device 120 that has been flagged as being forbidden with respect to the candidate data block. For example, the distribution module 330 may retrieve redundancy information for the selected candidate data block from the metadata store 305. Based on the redundancy information, the distribution module 330 identifies those storage devices 120 on which the candidate data block cannot be stored for purposes of fault tolerance. As a result, the distribution module 330 does not select, as a target, those storage devices 120 identified by the redundancy information for the candidate data block.

After selecting a target storage device 120 for the candidate data block, the distribution module 330 repeats the selection of candidate data blocks and the identification of target storage devices for the current bucket. In particular, the distribution module 330 selects other candidate data blocks currently stored on storage devices 120 with excessive numbers of data blocks for the current bucket, and identifies suitable target storage devices 120 to which to move the candidate data blocks under the redistribution plan.

In one implementation, if the allocation of a selected candidate data block to a target storage device 120 would cause the target storage device 120 to reach its maximum storage capacity under the redistribution plan, the distribution module 330 performs additional processing to account for the "full" target storage device 120. For example, a target storage device 120 may have a maximum capacity of 1 TB. If the allocation of a selected candidate data block to the target storage device 120 would cause the target storage device 120 to store 1 TB of data, the distribution module 330 performs additional processing.

In performing the additional processing, the distribution module 330 removes the full target storage device 120 from future consideration as the target for the storage of subsequently selected candidate data blocks. Thereafter, the target number of data blocks for each of the remaining storage devices 120 for each bucket is updated to account for the full target storage device 120. Subsequently, any additionally selected candidate data blocks for the current bucket are assigned to the remaining target storage devices 120 based on the updated target numbers for the remaining storage devices 120. The selection of candidate data blocks for subsequent buckets may also be based on the updated target numbers for the remaining storage devices 120.

In one embodiment, the selection of candidate data blocks and the identification of target storage devices 120 for a current bucket terminates once no unprocessed candidate data blocks for the bucket can be identified. More specifically, the distribution module 330 terminates processing for the current bucket if the distribution module 330 cannot identify a candidate data block that can be moved from a storage device 120 such that the storage device 120 contains a number of data blocks for the storage device that is closer to the storage device 120's target number of the data blocks (or the threshold number/threshold percentage) for the bucket.

After processing of a particular bucket, the distribution module 330 performs the selection of data blocks and identification of target storage devices for subsequent buckets in a similar manner. Upon completing the selection of candidate data blocks and identification of target storage devices for each bucket, the distribution module 330 terminates processing of the data blocks of the buckets. The result of the processing is a redistribution plan indicating the target storage devices 120 to which a set of selected candidate data blocks are to be redistributed.

In one implementation, the distribution module 330 generates the redistribution plan according to a randomized greedy allocation scheme. More specifically, the distribution module 330 generates the redistribution plan by processing the data blocks of the bucket associated with the most recent access pattern level and largest data block storage size requirement. Thereafter, the distribution module 330 subsequently processes data blocks of buckets with progressively less recent access pattern levels and/or smaller data block storage sizes.

By processing data blocks in this order, more recently accessed ("hotter") and larger sized data blocks can be reassigned under the redistribution plan first, which increases the probability that such data blocks are uniformly and/or proportionally distributed across the storage devices 120. Such is the case because fewer storage devices are likely to have reached their maximum post-redistribution storage capacity earlier on during processing. As a result, the data throughput of the distributed storage 122 with respect more likely to be accessed and larger sized data blocks can be improved.

Figure 3B:
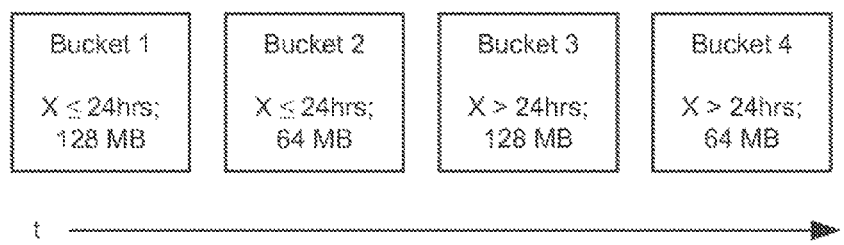
FIG. 3B is a high-level diagram illustrating an example order in which data blocks of a group of buckets may be processed according to one embodiment.

In one embodiment, the distribution module 330 processes the data blocks of buckets with more recent access pattern levels before processing the data blocks of buckets with less recent access pattern levels. Among buckets having the same access pattern levels, the distribution module 330 processes the data blocks of buckets in descending order by storage size requirement. Referring to FIG. 3B, it shows a high-level diagram illustrating an example order in which the data blocks of a group of buckets may be processed according to the embodiment. As shown in FIG. 3B, the data block analysis module 325 has assigned the data blocks of the distributed storage 122 into four different buckets. In processing the data blocks, the distribution module 330 begins with data blocks in the bucket 1 because the first bucket has the most recent access pattern level (i.e., $X \leq 24$ hours) and largest storage size requirement (i.e., 128 MB). Thereafter, the distribution module 330 processes the data blocks in bucket 2 since bucket 2 has the same access pattern level relative to bucket 1, and a progressively smaller storage size requirement. Subsequently, because no other data buckets associated with the same access pattern level as bucket 1 or 2 exists, the distribution module 330 processes the data blocks in buckets with the next most recent access pattern level, which in the example are the data blocks of bucket 3 and bucket 4. With respect to bucket 3 and bucket 4, the distribution module 330 processes the data blocks in bucket 3 first since bucket 3 has a larger storage size requirement relative to the storage size requirement of bucket 4.

Figure 3C:
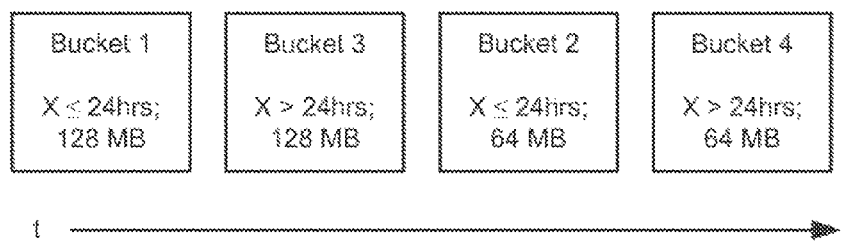
FIG. 3C is a high-level diagram illustrating an example order in which data blocks of a group of buckets may be processed according to another embodiment.

In another embodiment, the distribution module 330 processes the data blocks of buckets with larger storage size requirements before processing the data blocks of buckets with smaller storage size requirements. Among buckets having the same storage size requirements, the distribution module 330 processes the data blocks in order by most recent access pattern level. Referring to FIG. 3C, it shows a high-level diagram illustrating an example order in which the data blocks of a group of buckets may be processed according to the embodiment. As shown in FIG. 3C, the data block analysis module 325 has assigned the data blocks of the distributed storage 122 into four different buckets. In processing the data blocks, the distribution module 330 begins with data blocks in the bucket 1 because the first bucket has the most recent access pattern level and largest storage size requirement. Thereafter, the distribution module 330 processes the data blocks in bucket 3 since bucket 3 has the same storage size requirement as bucket 1, and a progressively less recent access pattern level. Subsequently, because no other data buckets associated with the storage size requirement as bucket 1 or 3 exists, the distribution module 330 then processes the data blocks in buckets with the next largest storage size requirement, which in this case are that data blocks of bucket 2 and bucket 4. With respect to bucket 2 and bucket 4, the distribution module 330 processes the data blocks in bucket 2 first since the bucket has a more recent access pattern level than bucket 4.

In one embodiment, after generating the redistribution plan, the distribution module 330 redistributes the data blocks according to the redistribution plan. More specifically, the distribution module 330 moves the candidate data blocks specified in the redistribution plan from the data blocks' current storage devices 120 to the identified target storage devices 120. The distribution module 330 further updates the data index 310 of the metadata store 305 to reflect the new storage locations of the redistributed data blocks.

Figure 4:
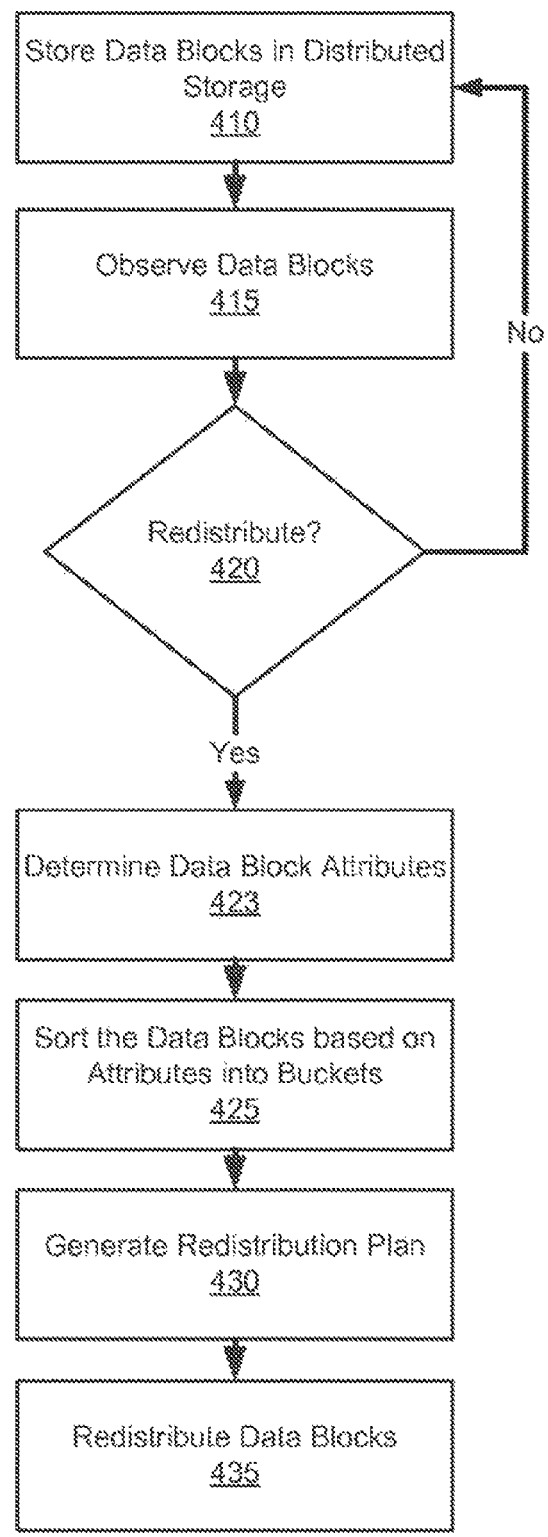
FIG. 4 is a flow chart illustrating a method for redistributing data in a distributed storage system based on attributes of the data according to one embodiment.

Method for Redistributing Data in a Distributed Storage System Based on Attributes of the Data FIG. 4 is a flowchart illustrating a method for redistributing data in a distributed storage system based on attributes of the data according to one embodiment. Other embodiments can perform the steps of the method in different orders and can include different, additional and/or fewer steps. Likewise, multiple instances of the steps may be performed in parallel.

The method shown in FIG. 4 can be performed by the data management module 115. In particular, the data management module 115 stores 410 one or more data blocks in the storage devices 120. More specifically, the data management module 115 may receive one or more data files for storage from, for example, the client devices 105. In storing the data files, the data management module 115 stores the data files in one or more data blocks of the distributed storage 122. Subsequently, the data management module 115 observes 415 the access patterns of the data blocks of the distributed storage 122. More specifically, the data management module 115 determines times where data operations (e.g., read or write operations) have been performed on the data blocks. Such access pattern data is stored in the metadata store 305.

At a later time, the data management module 115 determines 420 whether to redistribute the data stored in the distributed storage 122 in order to improve the throughput of the distributed storage 122. If it is determined that the data is to be redistributed, the data management module 115 determines 423 attributes of the data blocks. In particular, the data management module 115 accesses the metadata store 305 to determine the observed access patterns for each data block. The data management module 115 additionally accesses the metadata store 305 to determine the storage size of each data block. Thereafter, the data management module 115 sorts 425 each data block into a particular bucket based on the data block's observed access pattern and storage size. After sorting the data blocks, the data management module 115 generates 430 a redistribution plan according to either a uniform or proportional distribution scheme based on the buckets. After generating the redistribution plan, the data management module 115 redistributes 435 the data blocks across the storage devices 120. More specifically, the data management module 115 redistributes the data blocks of the storage devices 120 such that data blocks having similar attributes are spread across the storage devices 120. In one embodiment, data blocks having similar attributes are distributed uniformly across the storage devices 120 according to the uniform distribution scheme. In another embodiment, data blocks having similar attributes are distributed proportionally across the storage devices 120 based on the bandwidth of the storage devices 120 according to the proportional distribution scheme.

Figure 5A:
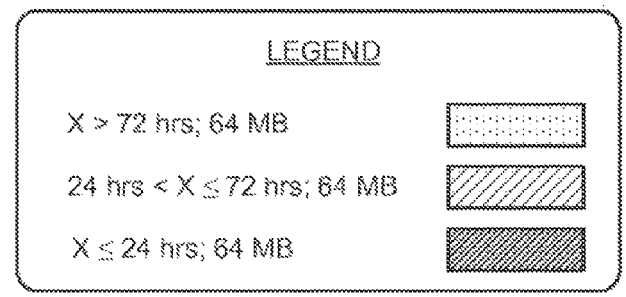
FIGS. 5A and 5B are diagrams together showing an example of the redistribution of data according to a uniform distribution scheme according to one embodiment.
Figure 5A:
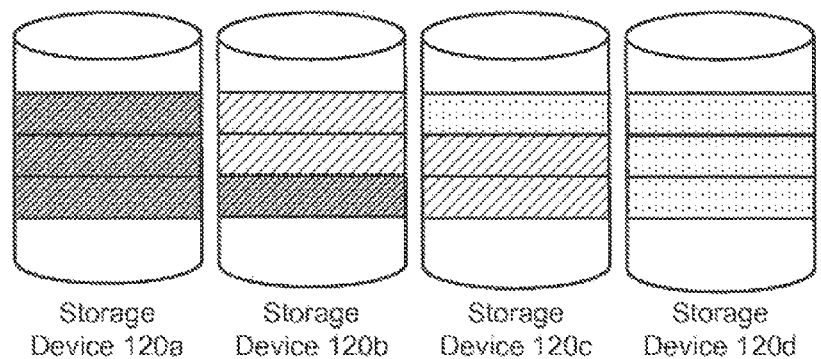
Figure 5B:
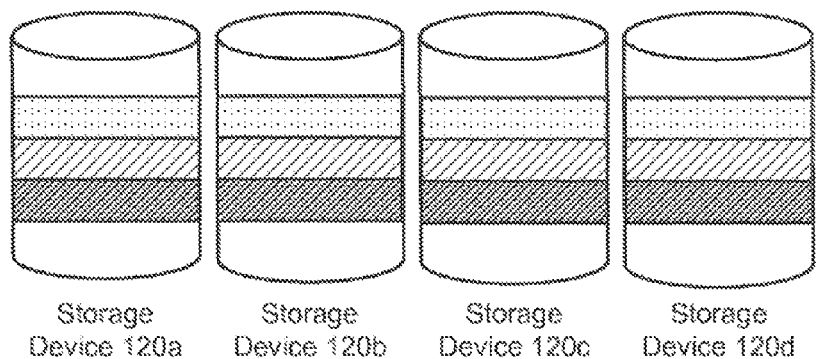

Example of the Redistribution of Data According to a Uniform Distribution Scheme FIGS. 5A and 5B are diagrams that together showing the redistribution of data according to a uniform distribution scheme according to one embodiment. Referring to FIG. 5A, it shows an example of the data blocks stored by four interconnected storage devices 120a-120d of the distributed storage 122 prior to redistribution. As shown in FIG. 5A, the data blocks stored by the storage devices 120a-120d have varying attributes. More specifically, each of the data blocks has an access pattern indicating that the data block has been (1) last accessed in the previous 24 hours, (2) last accessed between 24 hours and 72 hours from the current time, or (3) last accessed longer than 72 hours from the current time. Each of the data blocks also has a storage size of 64 MB. As further shown in FIG. 5A, a large concentration of the data blocks that have been accessed in the last 24 hours are concentrated in the storage device 120a. Because such "hot" data blocks are primarily concentrated in the storage device 120a, the overall data throughput of the distributed storage 122 with respect to the retrieval of the hot data blocks may be relatively poor.

Referring now to FIG. 5B, it shows an example of the data blocks stored by the four interconnected storage devices 120a-120d following redistribution according to a uniform distribution scheme. As shown in FIG. 5B, data blocks having the same attributes are redistributed uniformly across each of the storage devices 120a-120d. For example, data blocks having been accessed in the previous 24 hours are distributed uniformly across the storage devices 120a-120d, which enables improvements in the overall data throughput of the distributed storage 122 with respect to the data blocks.

Figure 5C:
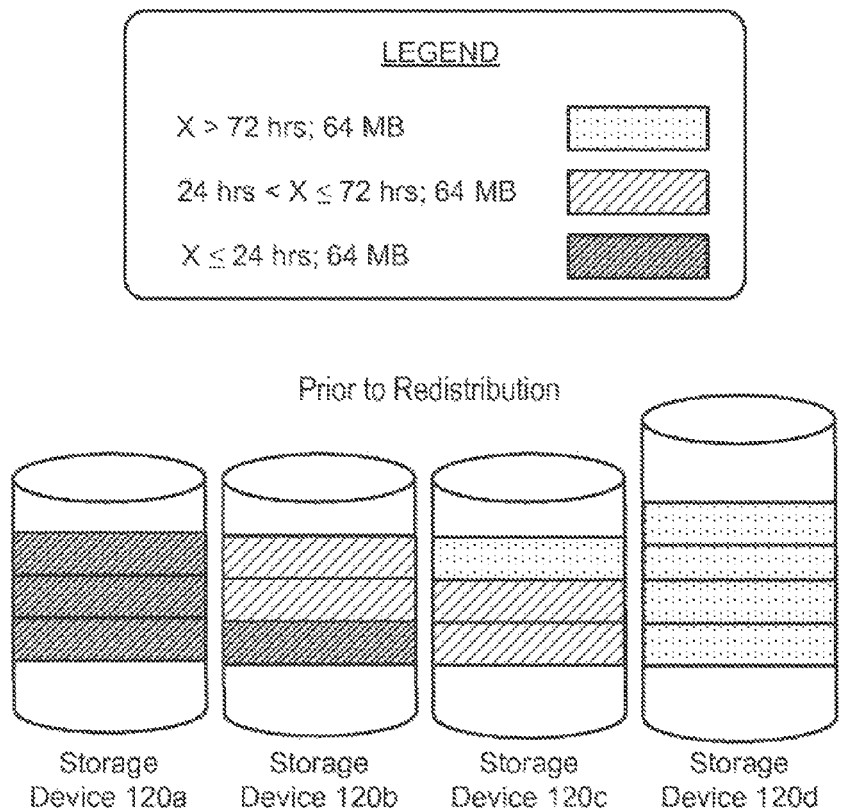
FIGS. 5C and 5D are diagrams together showing an example of the redistribution of data according to a uniform distribution scheme according to another embodiment.
Figure 5D:
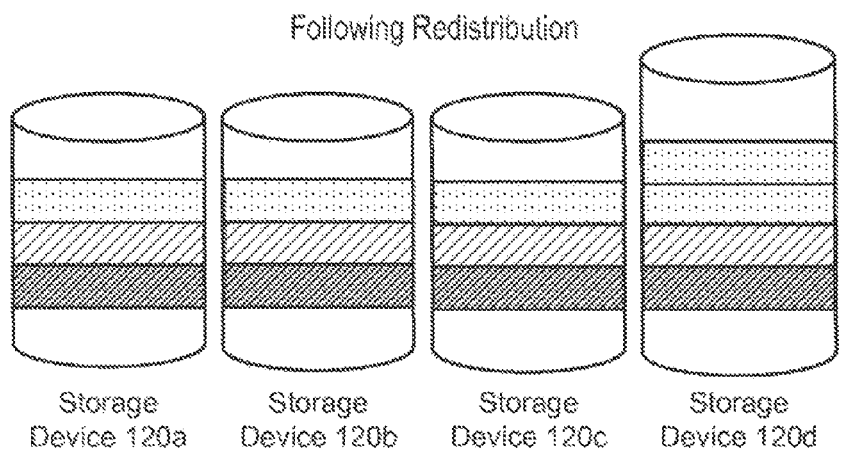

FIGS. 5C and 5D are similar to FIGS. 5A and 5B, except that the storage devices 120 are shown with varying storage capacity sizes. In particular, the storage devices 120a-120c may each be 1 TB in capacity while the storage device 120d may be 1.5 TB in capacity.

Figure 6A:
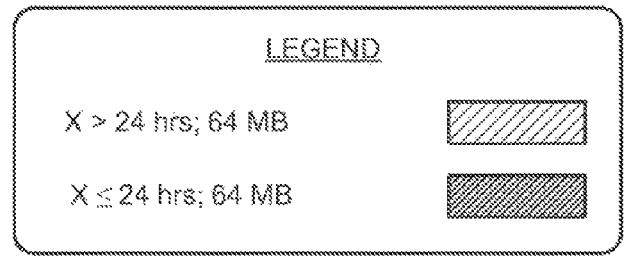
FIGS. 6A and 6B are diagrams together showing an example of the redistribution of data according to a proportional distribution scheme according to one embodiment.
Figure 6A:
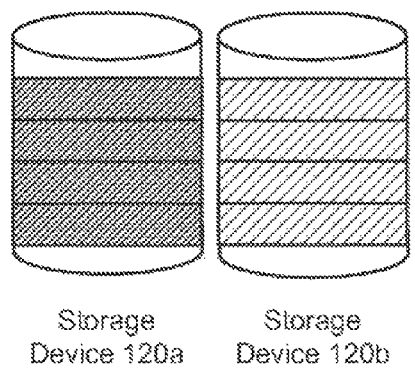
Figure 6B:
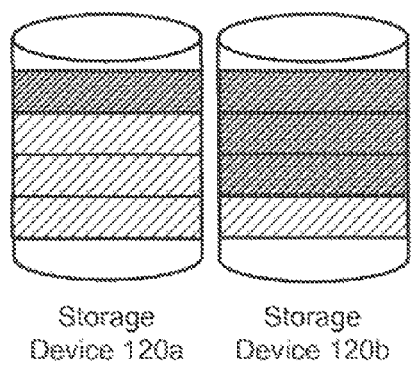

Example of the Redistribution of Data According to a Proportional Distribution Scheme FIGS. 6A and 6B are high-level diagrams that together showing the redistribution of data according to a proportional distribution scheme according to one embodiment. Referring now to FIG. 6A, it shows an example of the data blocks stored by the two interconnected storage devices 120a and 120b of the distributed storage 122 prior redistribution. As shown in FIG. 6A, the data blocks stored by the storage devices 120a and 102b have varying attributes. More specifically, each of the data blocks has an access pattern indicating that the data block has been (1) last accessed in the previous 24 hours, or (2) last accessed more than 24 hours from the current time. Each of the data blocks also has a storage size of 64 MB. As further shown in FIG. 6A, a large number of the data blocks that have been accessed in the last 24 hours is concentrated in the storage device 120a. Because such "hot" data blocks are primarily stored in the storage device 120a, the overall data throughput of the distributed storage 122 with respect to the retrieval of the hot data blocks may be relatively poor.

Referring now to FIG. 6B, it shows an example of the data blocks stored by the two interconnected storage devices 120a and 120b following redistribution according to a proportional distribution scheme. As shown in FIG. 6B, because the storage device 120b is three times faster than the storage device 120a, the storage device 120b is configured to store three times more of the data blocks that have been accessed in the previous 24 hours than the storage device 120a. In this way, the data throughputs of the storage device 120a and 120b with respect to the "hot" data blocks can be roughly equal, which minimizes the overall time required to read the "hot" data blocks. It should be appreciated that the proportional distribution scheme also attempts to proportionally store data blocks having been accessed longer than 24 hours. However, during distribution, the capacity of the storage device 120b will be reached, and thus the remaining data blocks that have been accessed longer than 24 hours from the current time are stored onto the storage device 120a.

Figure 6C:
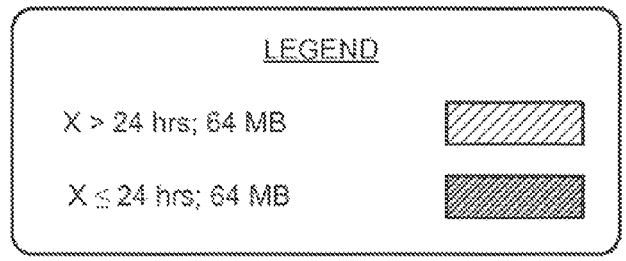
FIGS. 6C and 6D are diagrams together showing an example of the redistribution of data according to a proportional distribution scheme according to one embodiment.
Figure 6C:
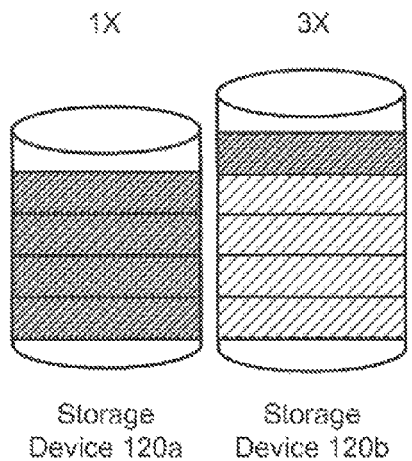
Figure 6D:
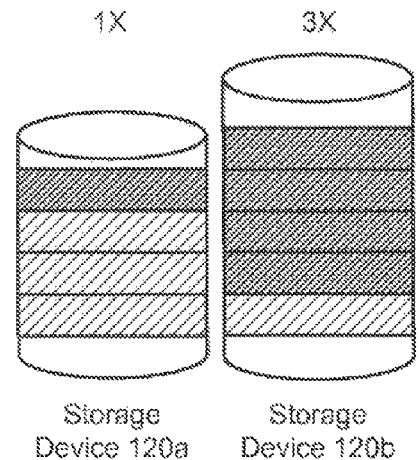

FIGS. 6C and 6D are similar to FIGS. 6A and 6B, except that the storage devices 120 are shown with varying storage capacity sizes. In particular, the storage device 120a has a capacity of 1 TB while the storage device 120b has a capacity of 1.5 TB.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method comprising:
   categorizing a plurality of data blocks into a plurality of categories according to an access pattern and a size corresponding to respective data blocks of the plurality of data blocks, wherein each category of the plurality of categories is associated with a respective access pattern level and respective data block storage size requirement;
   calculating a target number of data blocks for a first category for each of a plurality of storage devices of a distributed storage by dividing a total number of data blocks in the first category by a number of the plurality of storage devices; and
   redistributing the data blocks in the first category across the plurality of storage devices according to the calculated target number of data blocks for each of the plurality of storage devices.

2. The method of claim 1, wherein redistributing comprises uniformly redistributing data blocks having similar access patterns and storage sizes across the plurality of storage devices.

3. The method of claim 1, wherein redistributing is further based on a determined performance characteristic for the plurality of storage devices.

4. The method of claim 3, wherein redistributing comprises redistributing the plurality of data blocks across the plurality of storage devices in proportion to a determined performance characteristic for the plurality of storage devices.

5. The method of claim 4, wherein the determined performance characteristic comprises bandwidth of each of the plurality of storage devices.

6. The method of claim 4, wherein the determined performance characteristic comprises storage capacity of each of the plurality of storage devices.

7. A non-transitory computer readable storage medium executing computer program instructions, the computer program instructions comprising instructions for:
   categorizing a plurality of data blocks into a plurality of categories according to an access pattern and a size corresponding to respective data blocks of the plurality of data blocks, wherein each category of the plurality of categories is associated with a respective access pattern level and respective data block storage size requirement;
   calculating a target number of data blocks for a first category for each of a plurality of storage devices of a distributed storage by dividing a total number of data blocks in the first category by a number of the plurality of storage devices; and
   redistributing the data blocks in the first category across the plurality of storage devices according to the calculated target number of data blocks for each of the plurality of storage devices.

8. The medium of claim 7, wherein redistributing comprises uniformly redistributing data blocks having similar access patterns and storage sizes across the plurality of storage devices.

9. The medium of claim 7, wherein redistributing is further based on a determined performance characteristic for the plurality of storage devices.

10. The medium of claim 9, wherein redistributing comprises redistributing the plurality of data blocks across the plurality of storage devices in proportion to the determined performance characteristic for the plurality of storage devices.

11. The medium of claim 10, wherein the determined performance characteristic comprises bandwidth of each of the plurality of storage devices.

12. The medium of claim 10, wherein the determined performance characteristic comprises storage capacity of each of the plurality of storage devices.

13. A system comprising:
 a non-transitory computer readable storage medium storing processor-executable computer program instructions, the instructions comprising instructions for:
  categorizing a plurality of data blocks into a plurality of categories according to an access pattern and a size corresponding to respective data blocks of the plurality of data blocks, wherein each category of the plurality of categories is associated with a respective access pattern level and respective data block storage size requirement;
  calculating a target number of data blocks for a first category for each of a plurality of storage devices of a distributed storage by dividing a total number of data blocks in the first category by a number of the plurality of storage devices; and
  redistributing the data blocks in the first category across the plurality of storage devices according to the calculated target number of data blocks for each of the plurality of storage devices; and
 a processor for executing the computer program instructions.

14. The system of claim 13, wherein redistributing comprises uniformly redistributing data blocks having similar access patterns and storage sizes across the plurality of storage devices.

15. The system of claim 13, wherein redistributing is further based on a determined performance characteristic for the plurality of storage devices.

16. The system of claim 15, wherein redistributing comprises redistributing the plurality of data blocks across the plurality of storage devices in proportion to the determined performance characteristic for the plurality of storage devices.

17. The system of claim 16, wherein the determined performance characteristic comprises bandwidth of each of the plurality of storage devices.

18. The system of claim 16, wherein the determined performance characteristic comprises storage capacity of each of the plurality of storage devices.

* * * * *